Figure 1:
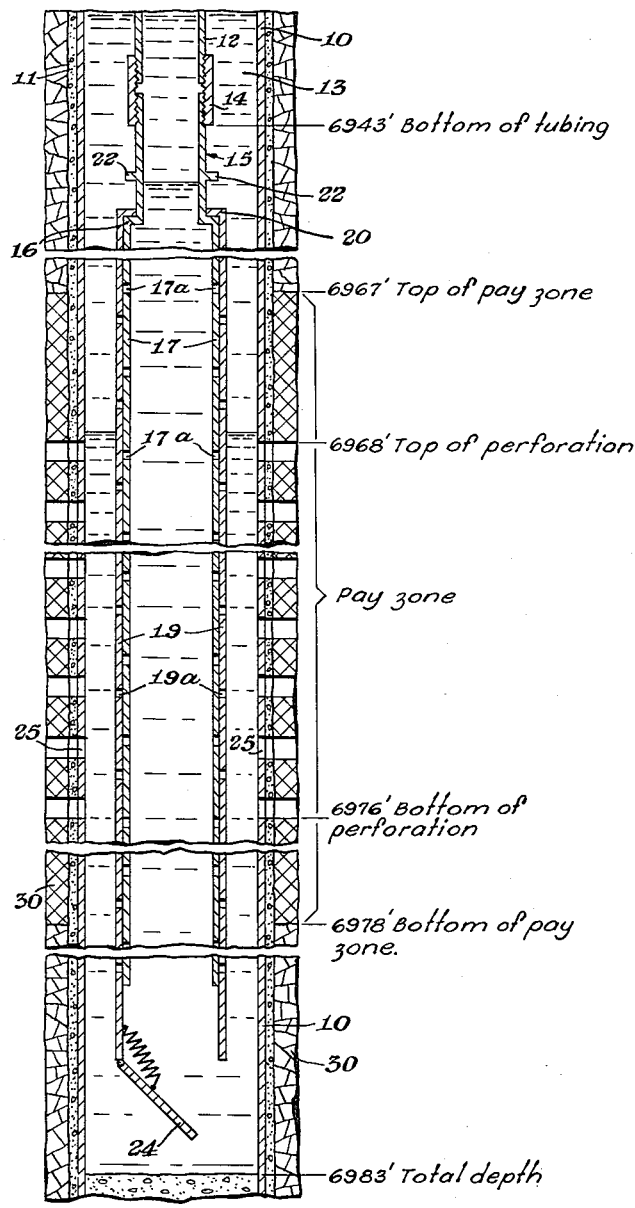

May 30, 1961  L. E. NESBITT ET AL  2,986,538
PARTICULATE RESIN-COATED COMPOSITION
Filed Oct. 13, 1958  2 Sheets-Sheet 1

INVENTORS.
Lyle E. Nesbitt
Archie N. Barron
Benny B. Bradford
BY C.W. Carlin
ATTORNEY

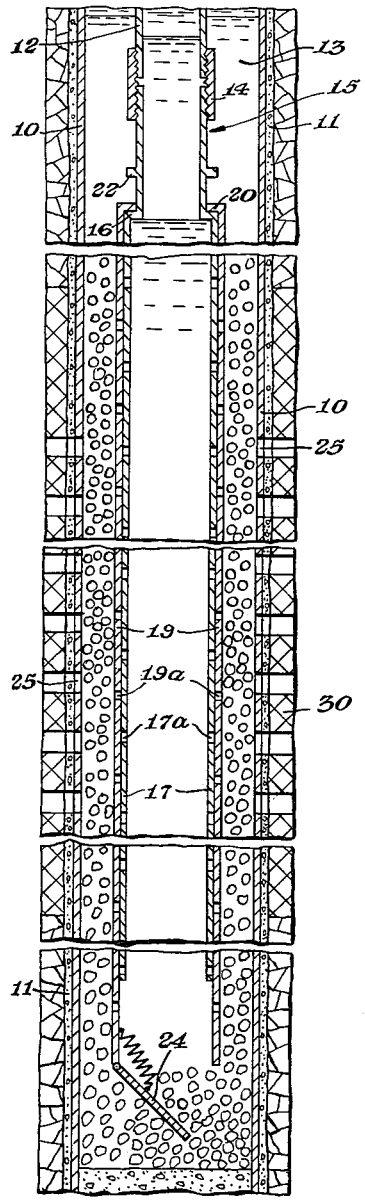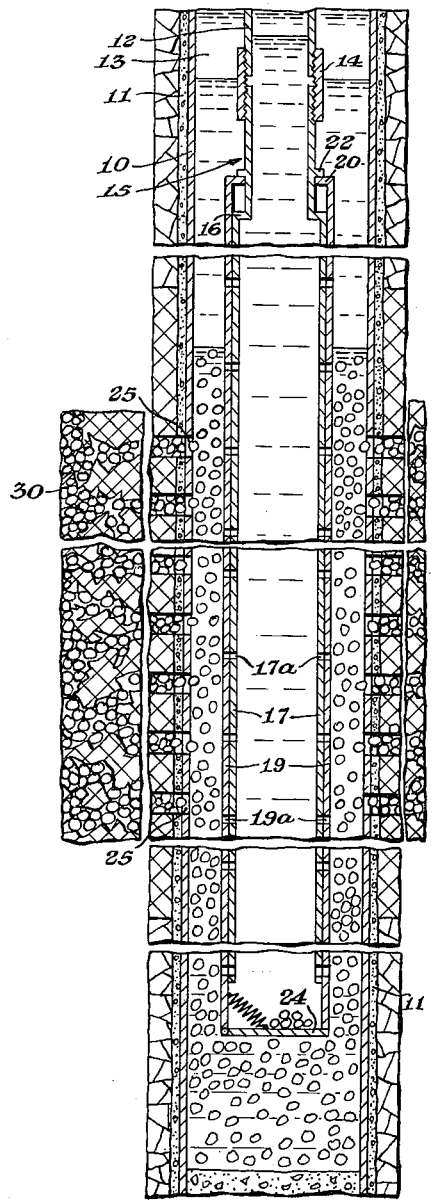
Fig. 3
Fig. 4
INVENTORS.
Lyle E. Nesbitt
Archie N. Barron
Benny B. Bradford
BY C.U.Carlin
ATTORNEY 2,986,538
Patented May 30, 1961

2,986,538

PARTICULATE RESIN-COATED COMPOSITION

Lyle E. Nesbitt, Lubbock, Tex., Archie N. Barron, Tulsa, Okla., and Benny B. Bradford, Fayetteville, Ark.

Filed Oct. 13, 1958, Ser. No. 766,703

8 Claims. (Cl. 260—14)

The invention relates to a method of resin-coating particles to form a fluid composition, to the composition thus formed, and to its use in treating wells penetrating a fluid-producing unconsolidated earth formation from which earthen material is carried into the well during production therefrom.

Broken bits of the formation, float sand, and the like, to which we shall refer to as detritus, are often carried into a well by the flow of the fluid being produced and there cause serious difficulties such as plugging, damage to pumps and valves, and excessive sediment in the fluid produced.

The difficulties and their cause have long been recognized and various expedients proposed for alleviating them. Among such proposals has been a particularly successful practice which may be broadly described as the emplacement of a deformable resin-coated particulate composition about the wellbore where the composition sets to a unitary fluid-permeable barrier to such detritus. U.S. Patent 2,823,753 and copending applications, Serial Numbers 619,093 and 617,373, filed September 26, 1956, and October 22, 1956, respectively, illustrate this practice.

The practice thus discribed has a pronounced drawback in actual use in that the preparation of the resin-coated particles has heretofore necessarily been done at the site of the well to be treated or in proximity thereto. The conditions prevailing at the site of the well are usually not conducive to performing efficiently such an operation: suitable equipment and the ingredients of the composition must be transported thereto; the mixing operation must be attended by skilled personnel; proper temperature must be maintained for the various steps of the mixing operation.

A desideratum, therefore, exists for a resin-coated particulate composition for treating a well which need not be prepared at or near the site of the well to be treated therewith.

This desideratum has been met and a number of additional advantages have been provided by the present invention wherein a resin-coated particulate composition, suitable for slurrying in oil and injecting into a well to provide a barrier for preventing detritus from entering a wellbore, is conveniently prepared at the laboratory, factory, home plant, central distributing point, or the like (where suitable equipment and required materials may be assembled and specialized personnel may be employed) on a more or less permanent basis to maintain an adequate supply of such composition.

How this desideratum has been satisfied and added advantages provided are made clear in the ensuing description in relation to the annexed drawing and are particularly defined in the appended claims.

The drawings show elevational views of an oil well at successive stages in the treatment of the well employing the resin-coated particulate composition in accordance with the invention. The drawings are described more fully under Example 2 set forth hereinafter.

The invention consists essentially of a resin-coated particulate composition, the improved method of preparing such composition, and the method of treating a well employing such composition to provide a fluid-permeable barrier against the entrance of detritus into the wellbore.

The resins which can be employed in the invention are those which ultimately polymerize or condense to a thermosetting resin but which at a stage of partial polymerization or condensation are thermoplastic. Resins having this combination of properties for the purpose of this invention are called thermoplastic-thermosetting. Such resins include phenol-aldehyde resins, epoxy resins, and alkyd or Glyptal resins.

Intermediate or stage B phenol-formaldehyde resins or such resins copolymerized with resorcinol are the preferred resins to use. A stage B phenol-formaldehyde resin is sometimes referred to as resistol, in contrast to stage A resins referred to as resole and stage C resins as resite. A stage B phenol-formaldehyde resin in general possesses the following characteristics: (1) It is a second stage condensation product; (2) it is not soluble in alkali solvents; (3) it is little cross-linked; (4) it is hard and brittle while at room temperature or colder; (5) it can be softened by heat; and (6) it can be made a thermosetting resin.

Instead of formaldehyde, other aldehydes may be used but are considered less desirable. Among them are: acetaldehyde, furfural, butyraldehyde, chloral, and acrolein.

The particulate material employed in the invention may be any pulverulent material unreactive with the hot resin. Nutshell, brittle synthetic resins, gilsonite, coke, peach pits, or sand, which is pulverized to a mesh size of between 10 and 100 but preferably between 10 and 40 is usually used. Ground walnutshell of either a mesh size of between 10 and 20 or between 20 and 30 is the preferred particulate material to use.

The oil for use in slurrying the resin-coated particles is a petroleum oil, e.g., diesel oil, gas oil, kerosene, lubricating oil, or crude oil. The viscosity of the oil is not critical so long as the oil remains satisfactorily fluid. It is preferred that it have a viscosity of between 10 and 100 seconds Saybolt Universal at 100° F. and a pour point of not lower than 10° F. The flash point should be sufficiently high to reduce unnecessary fire dangers, a minimum flash point of 270° F. Pensky-Martin closed cup, being recommended.

The ratio of the amount of particulate material to that of the liquid resin should be between 1 and 10 pounds of particulate material to 1 pound of liquid resin. When walnut-shell, having a mesh size between 10 and 20 mesh is employed, the ratio of the amounts of such size walnutshell to that of the liquid resin is preferably between 4 and 8 pounds of the shell per pound of resin and preferably 6 pounds of shell per pound of resin. When the walnutshell employed has a mesh size of between 20 and 30, then the ratio is preferably between 1½ and 4½ pounds of shell to 1 pound of resin.

The resin-coated particulate composition thus prepared may be boxed or packaged and stored or shipped directly to a well-treating site. There it is admixed with a vehicle, preferably a gelled petroleum oil, but permissibly with any gelled or ungelled or even aqueous liquid for injection into the well. The ratio of the resin-coated composition to vehicle or oil for injecting into the well is not critical, a ratio of about ½ pound of resin per gallon of oil being usually employed. The gelled oil employed is usually either one made by forming a soap in situ in a petroleum oil or one prepared in accordance with U.S. application, S.N. 692,727, filed October 28, 1957, wherein a gel concentrate is first made by reacting substantially stoichiometric quantities of a fatty acid having between 8 and 22 carbon atoms and an alkali metal hydroxide at the gelation temperature of the fatty acid employed and subsequently diluting the concentrate by the addition of more petroleum oil. Since the use of ground walnutshell and the intermediate stage phenol-aldehyde resin, or phenol-aldehyde-resorcinol resin, best illustrates the practice of the invention, the practice thereof will be described more fully employing such resin and walnutshell. The invention, however, is not to be construed as being limited thereto but to encompass the use of the resins and particulate material having the properties set out hereinabove and as defined in the claims.

In accordance with the invention, a phenol-formaldehyde resin may be prepared as follows:

A molar ratio of 1 mole of $C_6H_5OH$ to about 1.5 moles of HCHO with about 0.3 mole of hydrogen chloride added as a catalyst, usually as about a 32 percent by weight hydrochloric acid, are admixed in a reactor and heated at about 150° F. until the mixture becomes cloudy. An aqueous solution of NaOH, usually about 50 percent by weight, is then added to the reactor. The mixture thus produced then separates into an upper aqueous layer and a lower resinous layer having a pH of between 4.8 and 5.2 and a viscosity of between 700 and 950 centipoises and a density of about 9.9 pounds per gallon at 80° F. The resin is stable at normal temperature and pressure and may be stored for at least two months before use.

A phenol-formaldehyde-polyhydric phenol resin may be prepared as described in U.S. Patent 2,650,195, column 4, lines 3 to 53.

In the practice of the invention, either a phenol-formaldehyde or phenol-formaldehyde-polyhydric phenol, e.g., resorcinol, prepared as described above, is heated, preferably between about 180° and 200° F., and maintained at that temperature for from 1 to 2 hours, e.g., at about 200° F. for about 1 hour. It is preferably heated at such temperature until a viscosity of between 30 and 40 centipoises, measured at 200° F., is attained.

Ground walnutshell of a mesh size of between 10 and 30 mesh, U.S. Standard Sieve Series, in a ratio of between 1.5 and 8 pounds per pound of resin, are admixed in a blender while continuing to heat at about 200° F. Although a temperature of from about 180° F. to 210° F. may be used it is recommended that it be controlled at 200±2° F. After about 5 minutes of mixing, the resin-walnutshell mixture is slurried in a mineral oil at a temperature of between 180° and 210° F. but preferably at about 200° F. in a ratio of from about 1 to 1½ pounds of the shell-resin mixture of 1 gallon of oil. The heating is continued at about 200° F. until shell particle samples removed therefrom and cooled to about 100° F. show no tackiness. A simple test to determine this lack of tackiness is to remove about a ½ pound sample of the 200° F. coated shell from the mixture, immerse it in about ⅓ gallon of oil at 80° F. (the temperature of the shell thereby being brought to about 100° F.) and then removing the thus-cooled resin coated sample of particles and examining them for tackiness. Cooking time for the resin-coated particles in the oil is usually from about ¾ to 1¼ hours.

The oil slurry of the coated particles is then cooked while continuing to agitate the slurry. The rate of cooling is not highly critical but a cooling rate of between 1° and 3° F. per minute down to about 150° F. is recommended. A decrease in temperature which is appreciably slower than that will result in over-cooking the slurry. The cooling is continued down to between about 110° and 100° F. and the oil then drained from the coated particle composition.

An examination of the particles at this point will show them to be coated with a hard film of resin. The thus-coated particles are then preferably passed through a crusher or roller mill to break up any agglomerates that may have formed. The crusher or roller is selected and adjusted to provide particles of a mesh size somewhat larger than that of the original particles to allow for the added thickness of the resin. For example, when 10-20 mesh walnutshell is used, the resin-coated particles are crushed so that they will pass readily through a number 8 mesh sieve. The coating on the particles will remain stable at any temperature below 85° F. but will soften when the temperature is raised to 125° F. or higher and thereafter a mass of the so coated particles will form a unitary thermosetting mass.

The following examples illustrate the invention.

EXAMPLE 1

*Step 1*

390 pounds of phenol, 506 pounds of 37 percent by weight aqueous formaldehyde solution, and 50 pounds of 50 percent by weight NaOH aqueous solution were admixed in a reaction vessel and held at about 175° F. for about 2½ hours after which the admixture was acidified to a pH of 4 by adding 7.4 gallons of 32 percent by weight hydrochloric acid. As the acid was added, the mixture separated into 2 layers. The upper layer was about 38 percent by volume of the original mixture and comprised salt water. The lower layer was about 62 percent of the original mixture by volume and comprised a slightly acid partially condensed aqueous phenol-formaldehyde resin. This resin represented a molar ratio of phenol to formaldehyde of about 1.0 to 1.5.

To this was added, while agitating, 410 pounds of resorcinol which formed an aqueous partially condensed phenol-formaldehyde-resorcinol resin. This was a mole ratio of phenol to resorcinol of 1.0 to 0.9. This resin had a viscosity of 150 centipoises and a specific gravity of 1.23 at 80° F.

*Step 2*

400 pounds of the phenol-formaldehyde-resorcinol resin prepared in Step 1 were placed in a 50 gallon jacketed kettle provided with a heating and stirring means. The resin was heated to 200° F. and held at that temperature until a viscosity of between 30 and 40 centipoises (measured at 200° F.) was obtained. The viscosity value was determined by employing a Brookfield viscometer using a number 1 spindle at 60 r.p.m. During the heating period, the resin was stirred. The heating period was approximately 1 hour.

*Step 3*

1,172 pounds of 20 to 30 mesh walnutshell were placed in a 50 cubic foot helical ribbon blender which was situated for convenience under the jacketed mixing kettle. The 200° F. resin was added to the blender and mixing continued therein for a period of about 5 minutes. Both the heating period and the temperature control of this operation should be controlled for satisfactory results. If the resin is allowed to cool to less than about 180° F., the coating process will be very difficult due to the increased viscosity of the cooled resin. On the other hand, if the resin is allowed to remain at a temperature of 200° F. or higher for more than about 10 minutes after a viscosity of about 47 centipoises has been reached (measured at 200° F.), an excessive amount of resin will be retained on the shell particles due to the high viscosity resulting from prolonging the heating operation. Mixing times and temperatures between these extremes are desirably used.

2,625 pounds of a mineral oil (about 350 gallons) having a viscosity of between 55 and 65 seconds Saybolt Universal at 100° F., a pour point of 10° F., a minimum Pensky-Martin closed cup flash point of 270° F., known as Condor No. 1000 Mineral Oil, were heated to 210° F. with agitation in a polymerization kettle provided with stirring and heating means. The contents of the polymerization kettle were held at about 200°±2° F. for about 1 hour. To determine when the polymerization process had advanced sufficiently, a ½ pound sample of the shell material was dipped from the polymerization kettle by means of a strainer and placed in one-third gallon of mineral oil at a temperature of about 80° F. in accordance with the test described above. When the shell particles, examined, were found not to be tacky nor exhibit a tendency to stick together, the process was considered complete. The contents of the polymerization kettle was then cooled at a rate of about 2° F. per minute down to 100° F. and the oil then drained off.

*Step 5*

After the shell composition had cooled and the oil had thoroughly drained therefrom, it was removed from the kettle and passed through a 24-inch roller mill where it was crushed to a size such that all the particles passed readily through U.S. standard sieve having a mesh size of 8. As they dropped through the sieve the particles were packaged. A sample of the wanutshell composition thus made was used to determine the compression strength values, the result of which are set out in Table II, infra.

EXAMPLE 2

The resin coated particulate composition produced in Step 5 of Example 1 was used to provide a fluid-permeable barrier against unconsolidated material in an oil well in the Timbalier Bay Pool in La Fourche Parish, Louisiana. This pool lies in a loosely consolidated formation. An appreciable amount of sand is lodged in and about the base of the well bore and is produced with the oil from wells producing from this formation. A fluid-permeable barrier against such unconsolidated material is highly desirable in wells in this formation.

Figure 2:
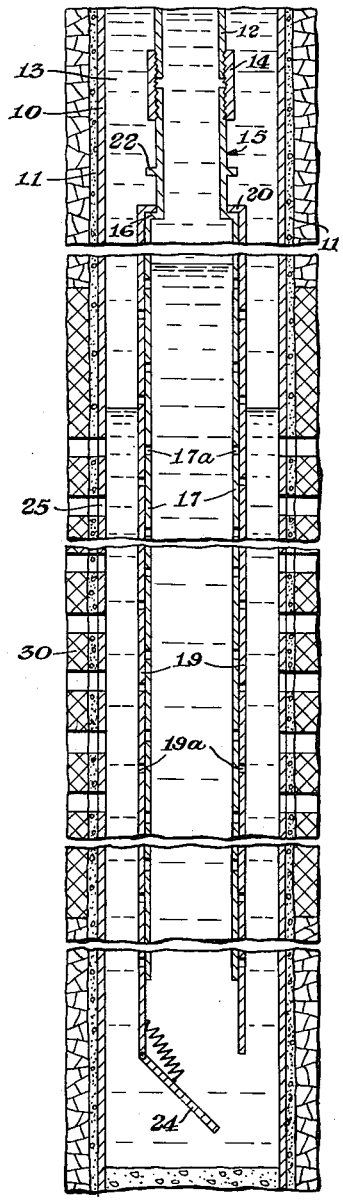

The well to be thus provided with a permeable barrier was completely sanded up and therefore not producing. A fragment of an elevational section of the well is represented by Figure 2 of the drawings. The well was cased with a 7-inch casing to the bottom thereof and was cemented off with a cement plug in the conventional manner. It was provided with means at ground level to control the flow of fluid therein. The well was 6983 feet deep, and had a pay zone between 6967 and 6978 feet. The bottom hole temperature was 172° F. The casing was perforated between the levels of 6968 and 6976 feet. A 2-inch tubing extended from the ground level to the depth of 6943 feet.

The drawings show casing 10, held in position by cement 11. Interior to casing 10 and concentric therewith is tubing 12 forming annulus 13 therebetween. The lower end of the tubing is threadedly engaged in coupling 14 which supports a screen assembly consisting essentially of neck 15 which terminates in flanged shoulder 16. Integrally affixed to shoulder 16 is inner sleeve 17 forming a downward extension thereof. Inner sleeve 17 has circumferentially spaced slots 17a therein which are arranged in vertical rows. The greatest dimension of slots 17a is less than the smaller dimensions of the resin-coated particles of the slurry composition of the invention.

Exterior to and concentric with inner sleeve 17 is outer sleeve 19 in sliding engagement therewith. Outer sleeve 19 is provided with inwardly extending rim 20 at the top thereof which provides hanging support therefor on shoulder 16. The upward slidability of outer sleeve 19 is limited by stop 22. Outer sleeve 19 is provided with slots 19a of similar configuration and orientation to slots 17a. At the foot of outer sleeve 19 is spring-loaded valve 24 which opens downwardly when sufficient pressure is created within sleeve 17.

There are also shown perforations 25 in casing 10 which are of sufficient cross-section to permit passage therethrough of the particles of the slurry composition of the invention. The formation adjacent the wellbore is designated 30.

When a pressure of about 200 p.s.i. or more is directed downwardly against valve 24, as by a fluid being pumped down tubing 12, slots 17a and 19a in sleeves 17 and 19 are placed in a non-registering position and valve 24 is forced open to allow passage outwardly therethrough from sleeve 17, as shown in Figures 1 to 3. On the other hand, when pressure is created in annulus 13 as by pumping fluid downwardly therein, the pressure thus created forces valve 24 shut which thus serves as a barrier against passage of fluid therethrough, and being an integral part of outer sleeve 19, causes the outer sleeve to be forced upward until it is forced against stops 22 thereby bringing slots 17a and 19a into registering alignment and permitting passage inwardly therethrough of fluid but substantially preventing passage therethrough of particles of the size of those of the composition of the invention.

The emplacement of the resin-coated particulate composition to provide a fluid-permeable barrier proceeded as follows.

At the beginning of the operation the wellbore was filled with drilling mud. A means for controlling flow into annulus 13 at ground level (not shown) was opened. Eight barrels of diesel oil followed by twenty barrels of drilling mud were pumped down tubing 12 while venting drilling mud from annulus 13. The diesel oil so injected into the tubing passed on down through collar 14 and into inner sleeve 17, a portion of the oil thereby being forced out through valve 24 and upwardly in annulus 13. The volume of the tubing, liner, and the portion of annulus 13 below perforations 25 had been previously calculated so that the injection of this volume of diesel oil resulted in the diesel oil being positioned or "spotted" opposite perforations 25 as shown in Figure 1. A corresponding volume of the drilling mud originally in the tubing and annulus was pushed upwardly in the annulus ahead of the diesel oil and vented from the annulus at the wellhead as aforementioned. Mud now stood above the diesel oil in both tubing 12 and annulus 13. The means for controlling flow from annulus 13 at the ground level was closed and five barrels of additional mud were pumped down tubing 12. The five barrels of the diesel oil which had been spotted opposite perforations 25 were thereby forced through perforation 25 into formation 30 as shown in Figure 2. The pressure resulting therefrom caused a breakdown of the formation in the vicinity of the perforations. Mud stood in both tubing 12 and the portion of annulus 13 above the diesel oil (similarly as in Figure 1) but at the lower level in tubing 12 shown in Figure 2.

During the performance of the above steps which may be considered preparatory of the well treatment according to the invention, the phenol-formaldehyde-resorcinol treated walnutshell composition made in Example 1 above was slurried as follows:

Twenty gallons of a gel concentrate were prepared according to application S.N. 692,727 by admixing diesel oil, a vegetable oil (consisting of a mixture of fatty acids analyzing 43 percent oleic acid, 39 percent palmitic acid, 10 percent stearic acid, 6 percent linoleic acid, and 2 percent myristic acid), and a 50 percent aqueous solution of NaOH at about 260° F. in a weight ratio of diesel oil, vegetable oil, and 50 percent caustic of 13:18.5:5.6, respectively. The mixture was then cooled to about 200° F. over a period of 1.5 hours while stirring. Stirring was then stopped and the mixture cooled to room temperature without further agitation. The gel concentrate so prepared comprised 18 percent soap in diesel oil.

The twenty gallons of gel concentrate thus prepared were placed in a 1000-gallon paddle-type mixing tank. Forty gallons of diesel oil were admixed therewith and mixing continued for ten additional minutes. Thereafter an additional 710 gallons of diesel oil were admixed therewith to make a smooth gelled oil.

To the gelled oil thus made were admixed 400 pounds of the resin-coated walnutshell composition of Example 1. The volume of the resulting slurried resin-coated composition was slightly over eighteen barrels.

The surface means for controlling fluid flow in annulus 13 was then opened and eight barrels of diesel oil pumped down the tubing to serve as a cushion followed by the eighteen barrels of the resin-coated walnutshell slurry prepared above. Thereafter eight more barrels of diesel oil were pumped down tubing 12 followed by twenty-three barrels of drilling mud. The total volume of the diesel oil, walnutshell slurry composition, and the drilling mud was just sufficient to occupy the volume of the tubing and screen assembly plus the portion of the annulus below casing perforation 25, thereby locating the walnutshell composition, the diesel oil, and mud as shown in Figure 3.

At this point in the treatment, the direction of flow in annulus 13 was reversed by providing egress of fluids from the top of tubing 12 and pumping drilling mud down annulus 13 at a pressure of 1200 p.s.i. for about fifteen minutes. This reverse pressure closed valve 24 at the foot of outer sleeve 19 and forced sleeve 19 upward which aligned slots 17a and 19a and thereby permitted passage of fluid therethrough and up tubing 12, but screened out the walnutshell particles of the composition from the slurry as the slurry was thus forced through the slots of the sleeves and up tubing 12. A portion of the particles was thus caused to pack about the exterior of sleeve 19. At the same time the pressure on the fluid in annulus 13 forced some walnutshell composition outwardly through casing perforations 25 into the pay zone in formation 30. Fourteen barrels of fluid were forced out the top of tubing 12 during the reversed pumping step. The status of the well at the end of this step is represented by Figure 4.

Although the use of gelled oil with the resin-coated walnutshell composition is the preferred practice of the invention, the composition may be admixed with ungelled oil and thus injected. The resin coated walnutshell composition should be employed in a ratio of between 0.25 and 1.25 pounds per gallon of oil.

The well, which had a bottomhole temperature of 172° F. was then shut in for 24 hours to allow the resin on the coated walnutshell to soften and set into a thermosetting mass to provide a fluid-permeable barrier against detritus and unconsolidated formation entering the wellbore.

Thereafter, the wheel was put back into production and the oil being produced therefrom was forced to pass through the fluid permeable barrier thus formed. An examination of the oil produced indicated no sand or other bits of unconsolidated formation therein showing that the job had been successful.

Although heating or cooking the phenol-formaldehyde or phenol-formaldehyde-resorcinol resin at 200±10° F. for about 1 hour was employed in the above example and represents the preferred conditions, satisfactory results were obtained when the temperature and time were varied for the phenol-formaldehyde-resorcinol reaction mixture employed in Example 2, prior to admixing the walnutshell. The results are shown in Table I below.

TABLE I

| Cooking Temperature, in ° F. | Cooking Time in Hours | Appearance of Walnutshell Particles |
|---|---|---|
| 100 | 16 | Tacky. |
| 120 | 16 | Dry and Satisfactory. |
| 150 | 5 | Do. |
| 175 | 2 | Do. |
| 200 (Example 1) | 1 | Do. |
| 250 | 0.5 | Do. |

Reference to Table I shows that time and temperature conditions of from 16 hours at 120° F. to 0.5 hour at 250° F. for heating the phenol-formaldehyde-resorcinol resin prior to admixing the walnutshell gave satisfactory results for the practice of the invention. It is recommended, however, that the temperature be controlled to between about 180° and 210° F.

EXAMPLE 3

To show that other phenol-formaldehyde type resins may be used in accordance with the invention, a phenol-formaldehyde resin was made up as follows: 1538 pounds of a 37 percent by weight aqueous solution of formaldehyde, 1179 pounds of phenol and 35 pounds of hydrochloric acid (20° Bé.) were mixed together and heated to 150° F. until the mixture became cloudy. The cloudy appearance took about 15 to 20 minutes. The heating was then continued for another 30 minutes after which 16 pounds of a 50 percent aqueous solution of sodium hydroxide were stirred into the mixture. The batch then separated into two layers, the top layer being water and the bottom being liquid phenol-formaldehyde resin. The top layer, amounting to about 150 gallons was discarded. The lower resinous layer which was a thick liquid material having a viscosity of 700 centipoises at 80° F., a pH of 5.0, and a density of 9.9 pounds per gallon was retained for use according to the invention. This resin material is stable for two months and longer under ordinary conditions.

The liquid phenol-formaldehyde resin thus made was then admixed with walnutshell similarly to the method employed in Example 1 above. The compression strength value was determined thereon. The results were set out in Table II infra.

Epoxy resins may be employed in the practice of the invention. Epoxy resins, like phenol-aldehyde resins, are well known to exist in a partially condensed stage, also usually referred to as a stage B resin. The first step in their preparation usually consists of reacting a polyhydric alcohol or a dibasic acid with epichlorohydrin employing a alkali metal hydroxide as a catalyst. The reaction may be represented broadly by the equation.

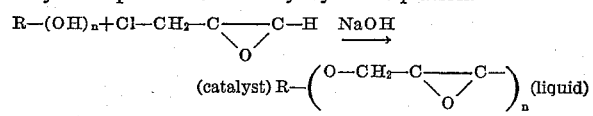

The stage B epoxy resin, i.e., one having a residual reactivity, may be produced by treatment of the liquid resin by a hardener or cross-linking agent such as an amine and then quenching the hardening process by rapid cooling. The resin thus produced is a solid which is thermoplastic, i.e., one which can be softened upon heating and caused to set to a thermosetting resin.

EXAMPLE 4

A thermosetting epoxy resin having an intermediate thermoplastic stage was employed according to the instant invention as follows: 1 part by weight of the epoxy resin to 3 parts by weight of 20–30 mesh crushed walnutshell were slurried in mineral oil of the type employed in Example 1 in the amount of 1 pound of resin-coated walnutshell composition to 1 gallon of oil following generally the procedure described in Example 1. The resin coated walnutshell composition was slurried with the oil at 200° F. for 0.5 hour, thereafter cooled and slurried from the oil. The composition was placed in storage for one week at 76° F. where they remained coalesced. It was thereafter heated to 175° F. for 48 hours during which the composition set to a hard mass. A compression strength value was obtained which is set out in Table II, infra.

Certain alkyd or glyptal resins may be employed in the practice of the invention. The preparation of alkyd resins is well known. Basically, it comprises condensing a polybasic acid, e.g., adipic or phthalic, or an anhydride thereof, with a polyhydric alcohol, e.g., propylene glycol or ethylene glycol. By selection of suitable acids and alcohols and suitable condensation control thermoplastic-thermosetting resins may be obtained suitable for use in the invention. The principal requisite for selection of the reactants for a resin appears to be that at least one of either the acid or alcohol have more than two functional groups. For example, suitable reactants for producing such a resin are phthalic acid and glycerol. A generally linear thermoplastic resin is formed in an early stage which upon subsequent heating crosslinks into a three-dimensional thermosetting resin.

EXAMPLE 5

Alkyd resins lend themselves to modification in a number of ways to produce a produce having the special properties necessary for use in the invention. An example of such a resin is known as Polyite No. 8005. It has a viscosity of 300–360 cps. at 77° F., contains 40 percent styrene, and is 100 percent polymerizable. Some of this resin was employed to prepare the composition of the invention. The resin was admixed with 20–30 mesh walnutshell in a ratio of 1:1.3 and thereafter slurried in Condor mineral oil of the type used in the examples above, following generally the procedures of Examples 1, 3, and 4 at a temperature of 200° F. for 0.5 hour. The compression value was determined and is set out in Table II, infra.

Urea-formaldehyde resins may be employed in the practice of the invention. Although the resin is commonly prepared as a thermosetting resin, by suitable modification it lends itself to the formation of an intermediate stage resin. Whereas 3 moles of urea when reacted under suitable conditions with 6 moles of formaldehyde in the presence of OH ions yields a cross-linked trimer resin, the presence of in the reaction mixture of modifier such as certain complex polyhydric alcohols produce an intermediate condensation product which may be softened by heat. Such a polyhydric alcohol is one formed by the reaction of phthalic anhydride with a glycol and represented by HO—X—OH. The reaction represented by the following equation is thought to take place:

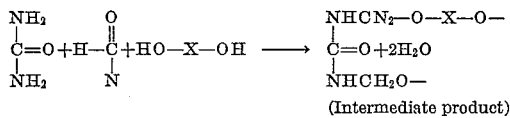

(Intermediate product)

EXAMPLE 6

An intermediate condensation product of urea and formaldehyde known as Urac 180 was admixed with 20–30 mesh walnutshell in a ratio of 1 of the resin to 1.3 of the walnutshell and slurried in oil in the ratio of 1 of the resin to 1 gallon of the oil generally following the procedure set out in the examples above, except that the resin-walnutshell composition was slurried in the mineral oil at 160° F. for 5 minutes.

The oil was drained therefrom and the resin-coated shell composition stored for one week and the temperature then raised to 175° F. for 48 hours as in Examples 3 and 4. The resin coated walnut-shell composition had set to a unitary mass. The compression strength was determined and is set out in Table II, infra.

The resins prepared in Examples 1 and 3–6, shown in Table II, were hard and stable at temperatures below 85° F., softened at a temperature of 125° F. or higher, and then set to a unitary thermosetting mass.

TABLE II

| Example | Resin Used | Temp. During Setting in ° F. | Setting Time in Hours | Compression Strength, p.s.i. |
|---|---|---|---|---|
| 1 | Phenol-Formaldehyde Resorcinol. | 175 | 16 | 1,751 |
| 3 | Phenol-formaldehyde | 175 | 70 | 793 |
| 4 | Epoxy | 300 | 48 | 50 |
| 5 | Alkyd | 200 | 48 | 35 |
| 6 | Urea-formaldehyde | 160 | 48 | 40 |

The results summarized in Table II show that the resins therein set out can be satisfactorily employed in the practice of the invention. They also show that the phenolic type resins produce an intermediate thermoplastic resin which upon subsequent heating sets to a resin which is stable at relatively high temperatures having particularly high compression strength values. Any of the type resins set out in Table II, however, when admixed with particulate material under the conditions of the invention may be stored and shipped from control plants to oilwell sites and there, as illustrated by Example 2, be slurried in oil and injected into a well to provide an effective fluid-permeable barrier against the contamination of the well by detritus entering the well.

Having described the invention what is claimed and desired to be protected by Letters Patent is:

1. The method of making a resin-coated particulate composition of discrete particles having a film of oil on the resin-coated particles of said composition for subsequent admixing with oil to make a pumpable well-treating oil slurry which sets in situ to a unitary mass when subjected to the thermosetting temperature of said resin comprising the steps of: heating, at a temperature between 120° and 250° F., a partially condensed stage B type resin which is thermosetting when subjected to a sufficiently high temperature but which is thermoplastic and capable of being repeatedly softened and hardened when subjected only to a temperature below the thermosetting temperature, until said resin has a viscosity of between 30 and 40 centipoises measured at 200° F.; admixing with said resin, while maintaining it at said temperature, a particulate material inert to said resin to resin-coat said particles and having a particle size such that substantially all passes through a No. 10 mesh sieve but is retained on a No. 100 mesh sieve; slurrying said mixture with sufficient oil to oil-wet the particles of said mixture while maintaining said temperature until said resin forms a dry hard coating on the particles upon being cooled to room temperature; and removing substantially all the oil from the resin-coated particules in excess of that adhering to and forming an oil film over said discrete particles.

2. The method of making an oil-treated resin-coated composition useful for injection into oil and gas wells to form a thermosetting fluid-permeable barrier in such wells consisting of: heating, at a temperature between 180° and 210° F., a partially condensed stage B type resin which is thermosetting when subjected to a sufficiently high temperature but which is thermoplastic and capable of being repeatedly softened and hardened when subjected to a temperature below the thermosetting temperature for a time sufficient to impart a viscosity to said resin, when measured at 200° F., of between 30 and 40 centipoises; admixing with said resin while thus heated a particulate material having a particle size such that substantially all passes through a No. 10 sieve but substantially all is retained on a No. 100 sieve and which is inert to said resin, in a ratio of about 1 pound of the resin to between 1 and 10 pounds of the particulate material to form a resin-coated particulate mixture; admixing with said mixture (without intervening cooling thereof below 180° F.) at a temperature between 180° F. and 210° F., a petroleum oil having a viscosity of between 10 and 100 seconds Saybolt Universal measured at 100° F.; continuing to heat the mixture thus formed until a dry hard coating is formed on the particulate material upon being cooled to room temperature; cooling the oil-slurried mixture to room temperature; draining off substantially all the excess oil from said mixture leaving a substantially non-tacky film of oil on the resin-coated particles; reducing the size of the individual particles of said mixture so that substantially all pass through a No. 8 mesh sieve; and admixing the thus oil-treated resin-coated descrete particulate material thus made with sufficient oil to form a pumpable fluid slurry for injecting and emplacing said composition into a well.

3. The method of claim 2, wherein said particulate material is ground nutshell of a 10 to 30 mesh.

4. The method of claim 3, wherein said nutshell is walnutshell having a mesh size of between 20 and 30 mesh.

5. The composition consisting essentially of phenol-formaldehyde-resorcinol resin coated walnutshell of a mesh size between 10 and 30 mesh prepared according to the method of claim 3.

6. The method of claim 2, wherein said partially condensed stage B type resin is selected from the class consisting of partially condensed phenol-aldehyde resins, urea-aldehyde resins, epoxy resins, phenol-aldehyde-polyhydric phenol resins, and modified alkyd resins.

7. The method of claim 6, wherein said partially condensed phenol-aldehyde resin is a stage B phenol-formaldehyde resin.

8. The method of claim 6, wherein said partially condensed phenol-aldehyde-polyhydric resin is a stage B phenol-formaldehyde-resorcinol resin.

References Cited in the file of this patent

UNITED STATES PATENTS

| | | |
|---|---|---|
| 2,815,815 | Hower et al. | Dec. 10, 1957 |
| 2,823,753 | Henderson et al. | Feb. 18, 1958 |
| 2,846,390 | Lummus et al. | Aug. 5, 1958 |